United States Patent
Kawamoto

(10) Patent No.: US 7,872,854 B2
(45) Date of Patent: *Jan. 18, 2011

(54) SEMICONDUCTOR CERAMIC, MONOLITHIC SEMICONDUCTOR CERAMIC CAPACITOR, METHOD FOR MANUFACTURING SEMICONDUCTOR CERAMIC, AND METHOD FOR MANUFACTURING MONOLITHIC SEMICONDUCTOR CERAMIC CAPACITOR

(75) Inventor: Mitsutoshi Kawamoto, Otsu (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/041,407

(22) Filed: Mar. 3, 2008

(65) Prior Publication Data
US 2008/0186655 A1  Aug. 7, 2008

Related U.S. Application Data

(63) Continuation of application No. PCT/JP2007/060816, filed on May 28, 2007.

(30) Foreign Application Priority Data

| May 31, 2006 | (JP) | ............... 2006-152812 |
| Jan. 15, 2007 | (JP) | ............... 2007-005522 |

(51) Int. Cl.
*H01G 4/06* (2006.01)

(52) U.S. Cl. ............... 361/321.1; 361/321.2; 361/321.4; 361/311; 361/312; 361/313

(58) Field of Classification Search ............... 361/321.1, 361/321.2, 321.4, 301.4, 306.1, 306.3, 311–313, 361/321.5

See application file for complete search history.

(56) References Cited

U.S. PATENT DOCUMENTS 6,359,327 B1   3/2002   Niimi et al.

(Continued)

FOREIGN PATENT DOCUMENTS

JP   1063204   3/1989

(Continued)

*Primary Examiner*—Nguyen T Ha
(74) *Attorney, Agent, or Firm*—Dickstein Shapiro LLP

(57) ABSTRACT

A semiconductor ceramic comprising a donor element within the range of 0.8 to 2.0 mol relative to 100 mol of Ti element contained as a solid solution with crystal grains, a first acceptor element in an amount less than the amount of the donor element is contained as a solid solution with the crystal grains, a second acceptor element within the range of 0.3 to 1.0 mol relative to 100 mol of a Ti element is present in crystal grain boundaries, and the average grain size of the crystal grains is 1.0 µm or less. A monolithic semiconductor ceramic capacitor is obtained by using this semiconductor ceramic. To form the semiconductor ceramic, in a first firing treatment to conduct reduction firing, a cooling treatment is conducted while the oxygen partial pressure at the time of starting the cooling is set at $1.0 \times 10^4$ times or more the oxygen partial pressure in the firing process. In this manner, a $SrTiO_3$ based grain boundary insulation type semiconductor ceramic having a large apparent relative dielectric constant $\varepsilon r_{APP}$ of 5,000 or more and a large resistivity log ρ (ρ: Ω·cm) of 10 or more even when crystal grains are made fine to have an average grain size of 1.0 µm or less, a monolithic semiconductor ceramic capacitor including the semiconductor ceramic, and methods for manufacturing them are realized.

15 Claims, 1 Drawing Sheet

U.S. PATENT DOCUMENTS

| | | | |
|---|---|---|---|
| 6,385,035 B1 * | 5/2002 | Matoba et al. | 361/321.1 |
| 6,437,970 B1 * | 8/2002 | Lee et al. | 361/311 |
| 6,556,423 B2 * | 4/2003 | Konaka et al. | 361/321.2 |
| 6,984,355 B2 * | 1/2006 | Niimi et al. | 264/620 |
| 7,154,736 B2 * | 12/2006 | Kirsten | 361/321.4 |
| 7,583,493 B2 * | 9/2009 | Tani et al. | 361/321.4 |

FOREIGN PATENT DOCUMENTS

| | | |
|---|---|---|
| JP | 11302072 | 11/1999 |
| KR | 10-2000-0076768 A | 12/2000 |

* cited by examiner

US 7,872,854 B2

SEMICONDUCTOR CERAMIC, MONOLITHIC SEMICONDUCTOR CERAMIC CAPACITOR, METHOD FOR MANUFACTURING SEMICONDUCTOR CERAMIC, AND METHOD FOR MANUFACTURING MONOLITHIC SEMICONDUCTOR CERAMIC CAPACITOR

CROSS REFERENCE TO RELATED APPLICATIONS

The present application is a continuation of International Application No. PCT/JP2007/060816, filed May 28, 2007, which claims priority to Japanese Patent Application No. JP2006-152812, filed May 31, 2006, and Japanese Patent Application No. JP2007-005522, filed Jan. 15, 2007, the entire contents of each of these applications being incorporated herein by reference in their entirety.

FIELD OF THE INVENTION

The present invention relates to a semiconductor ceramic, a monolithic semiconductor ceramic capacitor, a method for manufacturing a semiconductor ceramic, and a method for manufacturing a monolithic semiconductor ceramic capacitor. In particular, the present invention relates to a $SrTiO_3$ based grain boundary insulation type semiconductor ceramic, a monolithic semiconductor ceramic capacitor including the semiconductor ceramic, and methods for manufacturing them.

BACKGROUND OF THE INVENTION

In recent years, miniaturization of electronic components have been advanced rapidly as the electronics technology has been developed. In the field of monolithic ceramic capacitor as well, demands for miniaturization and increases in capacity have intensified. Therefore, development of ceramic materials having high relative dielectric constants and reduction in thickness and multilayering of dielectric ceramic layers have been advanced.

For example, Patent Document 1 proposes a dielectric ceramic represented by a general formula: $\{Ba_{1-x-y}Ca_xRe_yO\}_mTiO_2+\alpha MgO+\beta MnO$ (where Re is a rare earth element selected from the group consisting of Y, Gd, Tb, Dy, Ho, Er, and Yb, and $\alpha$, $\beta$, m, x, and y satisfy $0.001 \leq \alpha \leq 0.05$, $0.001 \leq \beta \leq 0.025$, $1.000 < m \leq 1.035$, $0.02 \leq x \leq 0.15$, and $0.001 \leq y \leq 0.06$, respectively).

Patent Document 1 discloses a monolithic ceramic capacitor including the above-described dielectric ceramic. The monolithic ceramic capacitor having a thickness of 2 μm per ceramic layer, the total number of effective dielectric ceramic layers of 5, a relative dielectric constant $\in r$ of 1,200 to 3,000, and a dielectric loss of 2.5% or less can be obtained.

The monolithic ceramic capacitor of Patent Document 1 takes advantage of a dielectric action of the ceramic itself. On the other hand, research and development on semiconductor ceramic capacitors based on a principle different from this have also been conducted intensively.

Among them, a $SrTiO_3$ based grain boundary insulation type semiconductor ceramic is produced by firing (primary firing) a ceramic compact in a reducing atmosphere to convert the ceramic compact to a semiconductor, coating the ceramic compact with an oxidizing agent containing $Bi_2O_3$ or the like and, thereafter, conducting firing (secondary firing (reoxidation)) in an oxidizing atmosphere to convert crystal grain boundaries to insulators. The relative dielectric constant $\in r$ of $SrTiO_3$ itself is about 200 and, therefore, is small. However, since the crystal grain boundaries have a capacitance, the apparent relative dielectric constant $\in r_{APP}$ can be increased by increasing the crystal grain size and reducing the number of crystal grain boundaries.

For example, in Patent Document 2, a $SrTiO_3$ based grain boundary insulation type semiconductor ceramic element assembly having an average grain size of crystal grains of 10 μm or less and a maximum grain size of 20 μm or less is proposed. This is a semiconductor ceramic capacitor having a single-layered structure. In the case where the average grain size of crystal grains is 8 μm, a semiconductor ceramic element assembly having an apparent relative dielectric constant $\in r_{APP}$ of 9,000 can be obtained.

Patent Document 1: Japanese Unexamined Patent Application Publication No. 11-302072

Patent Document 2: Japanese Patent No. 2689439

However, if reduction in thickness and multilayering of ceramic layers are pushed forward by using the dielectric ceramic described in Patent Document 1, there are problems in that the relative dielectric constant $\in r$ decreases, the temperature characteristic of the capacitance deteriorates, and short-circuit failures sharply increase.

Consequently, in the case where it is attempted to obtain a thin monolithic ceramic capacitor having a large capacity of, for example, 100 μF or more, the thickness of the dielectric ceramic layer is required to be about 1 μm per layer and the number of laminated layers is required to be about 700 layers to 1,000 layers, so that commercial application is difficult in this situation.

On the other hand, the $SrTiO_3$ based grain boundary insulation type semiconductor ceramic described in Patent Document 2 has good frequency characteristic and temperature characteristic and a small dielectric loss tan δ. The electric field dependence of the apparent relative dielectric constant $\in r_{APP}$ is small and, furthermore, a varistor characteristic is provided, so that breakage of the element can be avoided even when a high voltage is applied. Consequently, an application to the field of capacitors is expected.

However, regarding this type of semiconductor ceramic, a large apparent relative dielectric constant $\in r_{APP}$ is obtained by increasing the grain sizes of crystal grains, as described above. Therefore, if the grain sizes of crystal grains decrease, the apparent relative dielectric constant $\in r_{APP}$ becomes small so as to cause deterioration of the dielectric characteristic. Consequently, there is a problem in that it is difficult to allow the facilitation of reduction in layer thickness and the improvement of dielectric characteristic to become mutually compatible.

Furthermore, in order to commercially apply the semiconductor ceramic to a monolithic ceramic capacitor, it is required to ensure a sufficient insulating property even when the layer thickness is reduced. However, regarding the monolithic semiconductor ceramic capacitor, the insulating property comparable to that of the monolithic ceramic capacitor is not ensured in practice in the present situation.

SUMMARY OF THE INVENTION

The present invention has been made in consideration of the above-described circumstances. It is an object of the present invention to provide a $SrTiO_3$ based grain boundary insulation type semiconductor ceramic having a large apparent relative dielectric constant $\in r_{APP}$ even when crystal grains are made fine to have an average grain size of 1.0 μm or less and exhibiting an excellent insulating property, a monolithic semiconductor ceramic capacitor including the semiconductor ceramic, a method for manufacturing the above-described semiconductor ceramic, and a method for manufacturing the above-described monolithic semiconductor ceramic capacitor.

Regarding the $SrTiO_3$ based grain boundary insulation type semiconductor ceramic, a donor element is allowed to form a solid solution with crystal grains in order to convert the ceramic to a semiconductor. On the other hand, it is believed that if an acceptor element is allowed to form a solid solution with crystal grains, the influence of the donor element is canceled. Consequently, regarding the semiconductor ceramic, a technical idea that the acceptor element is allowed to form a solid solution with crystal grains together with the donor element has not occurred.

On the other hand, the inventors of the present invention conducted intensive research by trial and error on formation of a solid solution between a donor element, an acceptor element in addition to the donor element, and crystal grains. As a result, it was found that when a solid solution was formed from a predetermined amount of donor element, the acceptor element in an amount less than the amount of the above-described donor element, and crystal grains, and a predetermined amount of acceptor element (irrespective of whether the acceptor element was the same as the acceptor element which formed the solid solution with the crystal grains or not) was allowed to present in crystal grain boundaries, a $SrTiO_3$ based grain boundary insulation type semiconductor ceramic having a large apparent relative dielectric constant $\in r_{APP}$ of 5,000 or more and a large resistivity $\log \rho$ ($\rho$: $\Omega \cdot cm$) of 10 or more was able to be obtained even when crystal grains were made fine to have an average grain size of 1.0 μm or less.

The present invention has been made on the basis of the above-described findings. A semiconductor ceramic according to the present invention is a $SrTiO_3$ based grain boundary insulation type semiconductor ceramic and is characterized in that a donor element within the range of 0.8 to 2.0 mol relative to 100 mol of Ti element is contained as a solid solution with crystal grains, an acceptor element in an amount less than the amount of the above-described donor element is contained as a solid solution with the above-described crystal grains, an acceptor element within the range of 0.3 to 1.0 mol relative to 100 mol of the above-described Ti element is further present in crystal grain boundaries, and the average grain size of the crystal grains is 1.0 μm or less.

The semiconductor ceramic according to the present invention is characterized in that the above-described donor element includes at least one element selected from the group consisting of La, Sm, Dy, Ho, Y, Nd, Ce, Nb, Ta, and W.

The semiconductor ceramic according to the present invention is characterized in that the above-described acceptor element includes at least one element selected from the group consisting of Mn, Co, Ni, and Cr.

The semiconductor ceramic according to the present invention is characterized in that the acceptor element contained in the above-described crystal grains and the acceptor element contained in the above-described crystal grain boundaries are the same element.

The semiconductor ceramic according to the present invention is characterized in that the acceptor element contained in the above-described crystal grains and the acceptor element contained in the above-described crystal grain boundaries are different types of elements.

Segregation of the above-described acceptor element into the crystal grain boundaries can be facilitated by allowing a low-melting-point oxide within the range of 0.1 mol or less relative to 100 mol of the above-described Ti element to be contained.

That is, the semiconductor ceramic according to the present invention is characterized in that the low-melting-point oxide within the range of 0.1 mol or less relative to 100 mol of the above-described Ti element is contained.

The semiconductor ceramic according to the present invention is characterized in that the above-described low-melting-point oxide is $SiO_2$.

A monolithic semiconductor ceramic capacitor according to the present invention is characterized in that a component element assembly is formed from the above-described semiconductor ceramic, internal electrodes are disposed in the above-described component element assembly, and external electrodes electrically connectable to the above-described internal electrodes are disposed on a surface of the above-described component element assembly.

A method for manufacturing a semiconductor ceramic according to the present invention is a method for manufacturing a $SrTiO_3$ based grain boundary insulation type semiconductor ceramic, and the method is characterized by including the steps of weighing, mixing, and pulverizing a predetermined amount of ceramic raw material containing a donor compound and an acceptor compound and conducting a calcination treatment so as to prepare a calcined powder in a calcined powder preparation step, mixing a predetermined amount of acceptor compound with the above-described calcined powder and conducting a heat treatment so as to prepare a heat-treated powder in a heat-treated powder preparation step, and subjecting the above-described heat-treated powder to a primary firing treatment in a reducing atmosphere and conducting a secondary firing treatment in a weak reducing atmosphere, an air atmosphere, or an oxidizing atmosphere in a firing step, wherein the above-described donor compound is weighed in such a way that a donor element becomes within the range of 0.8 to 2.0 mol relative to 100 mol of the above-described Ti element, the above-described predetermined amount of acceptor compound is weighed in such a way that an acceptor element becomes within the range of 0.3 to 1.0 mol relative to 100 mol of the above-described Ti element, and the donor compound and the acceptor compound are mixed with the above-described calcined powder.

The inventors of the present invention further conducted intensive research. As a result, it was found that the resistivity was able to be further increased and the insulating property was able to be further improved by conducting a cooling treatment while the oxygen partial pressure at the time of starting the cooling was set at $1.0 \times 10^4$ times or more the oxygen partial pressure in the firing process regarding a reduction firing process, which was an intermediate step for a monolithic semiconductor ceramic capacitor, that is, a first firing treatment.

That is, a method for manufacturing a monolithic semiconductor ceramic capacitor according to the present invention is a method for manufacturing a $SrTiO_3$ based grain boundary insulation type semiconductor ceramic capacitor and the method is characterized by including the steps of weighing, mixing, and pulverizing a predetermined amount of ceramic raw material containing a donor compound and an acceptor compound and conducting a calcination treatment so as to prepare a calcined powder in a calcined powder preparation step, mixing a predetermined amount of acceptor compound with the above-described calcined powder and conducting a heat treatment so as to prepare a heat-treated powder in a heat-treated powder preparation step, subjecting the above-described heat-treated powder to molding to prepare ceramic green sheets and, thereafter, laminating internal electrode layers and the ceramic green sheets alternately so as to form a ceramic laminate in a ceramic laminate formation step, and subjecting the above-described ceramic laminate to a primary firing treatment in a reducing atmosphere and conducting a secondary firing treatment in a weak reducing atmosphere, an air atmosphere, or an oxidizing atmosphere in a firing step, wherein the above-described first firing treatment is carried out on the basis of a firing profile including a temperature raising process, a firing process, and a cooling process and the oxygen partial pressure at the time of starting the cooling is set at $1.0 \times 10^4$ times or more the oxygen partial pressure in the firing process.

The above-described "time of starting the cooling" includes not only the point in time when the cooling process is started, but also a short time after the cooling process is started until the temperature in a firing furnace decreases by a predetermined temperature from a maximum firing temperature.

According to the $SrTiO_3$ based grain boundary insulation type semiconductor ceramic of the present invention, a donor element, e.g., La and Sm, within the range of 0.8 to 2.0 mol relative to 100 mol of Ti element is contained as a solid solution with crystal grains, an acceptor element, e.g., Mn and Co, in an amount less than the amount of the above-described donor element is contained as a solid solution with the above-described crystal grains, an acceptor element within the range of 0.3 to 1.0 mol relative to 100 mol of the above-described Ti element is present in the crystal grain boundaries, and the average grain size of the crystal grains is 1.0 µm or less. Therefore, a semiconductor ceramic having a large apparent relative dielectric constant $\varepsilon r_{APP}$ and a large resistivity and, therefore, exhibiting excellent electrical characteristics can be obtained even when the average grain size of crystal grains is 1.0 µm or less. The apparent relative dielectric constant $\varepsilon r_{APP}$ is 5,000 or more and the resistivity log ρ (ρ: Ω·cm) is 10 or more.

The above-described operation and effect can be exerted irrespective of whether the acceptor element contained in the crystal grains and the acceptor element contained in the crystal grain boundaries are the same element or different types of elements.

Since the low-melting-point oxide, e.g., $SiO_2$, within the range of 0.1 mol or less relative to 100 mol of the above-described Ti element is contained, segregation of the acceptor element into the crystal grain boundaries is facilitated and a monolithic semiconductor ceramic having desired electrical characteristics can easily be obtained.

According to the monolithic semiconductor ceramic capacitor of the present invention, the component element assembly is formed from the above-described semiconductor ceramic, the internal electrodes are disposed in the above-described component element assembly, and the external electrodes electrically connectable to the above-described internal electrodes are disposed on a surface of the above-described component element assembly. Therefore, even when the layer thickness of the semiconductor ceramic layer constituting the component element assembly is reduced to about 1.0 µm, a large apparent relative dielectric constant $\varepsilon r_{APP}$ is exhibited, a large resistivity is exhibited, and an insulating property comparable to that of the known monolithic ceramic capacitor can be ensured. Consequently, a thin-layer, high-capacity monolithic semiconductor ceramic capacitor having a high practical value can be realized.

The method for manufacturing a semiconductor ceramic according to the present invention includes the steps of weighing, mixing, and pulverizing the predetermined amount of ceramic raw material containing the donor compound and the acceptor compound and conducting the calcination treatment so as to prepare the calcined powder in the calcined powder preparation step, mixing the predetermined amount of acceptor compound with the above-described calcined powder and conducting the heat treatment so as to prepare the heat-treated powder in a heat-treated powder preparation step, and subjecting the above-described heat-treated powder to the primary firing treatment in the reducing atmosphere and conducting the secondary firing treatment in the weak reducing atmosphere, the air atmosphere, or the oxidizing atmosphere in the firing step, wherein the above-described donor compound is weighed in such a way that the donor element becomes within the range of 0.8 to 2.0 mol relative to 100 mol of Ti element, the above-described predetermined amount of acceptor compound is weighed in such a way that the acceptor element becomes within the range of 0.3 to 1.0 mol relative to 100 mol of the above-described Ti element, and the donor compound and the acceptor compound are mixed with the above-described calcined powder. Therefore, a semiconductor ceramic, which can have a larger resistivity while a desired large apparent relative dielectric constant $\varepsilon r_{APP}$ is ensured, can be obtained.

According to the method for manufacturing a monolithic semiconductor ceramic capacitor of the present invention, the oxygen partial pressure at the time of starting the cooling is set at $1.0 \times 10^4$ times or more the oxygen partial pressure in the firing process. Therefore, in the cooling process of the primary firing, the cooling treatment can be conducted while the oxygen partial pressure has increased. Consequently, the resistivity can further increase while the desired large apparent relative dielectric constant $\varepsilon r_{APP}$ is ensured, so that a monolithic semiconductor ceramic capacitor can be produced, wherein the insulating property can be further improved.

REFERENCE NUMERALS

Figure 1:
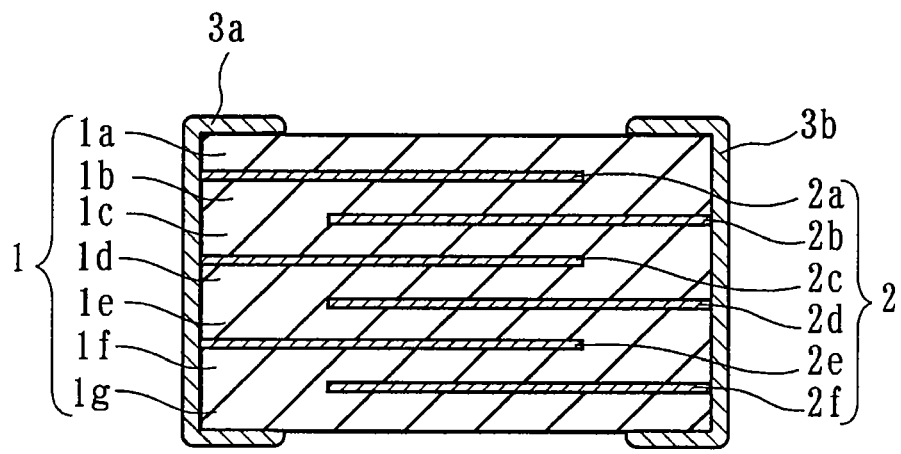
FIG. 1 is a sectional view schematically showing an embodiment of a monolithic semiconductor ceramic capacitor produced by using a semiconductor ceramic according to the present invention.

1: component element assembly
1a to 1g: semiconductor ceramic layer
2: internal electrode

DETAILED DESCRIPTION OF THE INVENTION

The embodiment of the present invention will be described below in detail.

A semiconductor ceramic according to an embodiment of the present invention is a $SrTiO_3$ based grain boundary insulation type semiconductor ceramic. A donor element within the range of 0.8 to 2.0 mol relative to 100 mol of Ti element is contained as a solid solution with crystal grains, and an acceptor element in an amount less than the amount of the above-described donor element is contained as the solid solution with the above-described crystal grains. Furthermore, an acceptor element in an amount less than the amount of the above-described donor element and within the range of 0.3 to 1.0 mol relative to 100 mol of the above-described Ti element is present in the crystal grain boundaries, and the average grain size of the crystal grains is specified to be 1.0 µm or less.

It has been previously known that a donor element is contained as a solid solution with crystal grains in order to convert ceramic to a semiconductor. However, it is not usually conducted to contain an acceptor element together with the donor element as a solid solution with crystal grains because the effect of the donor element is assumed to be cancelled.

On the other hand, the inventors of the present invention conducted intensive research by trial and error on formation of a solid solution between a donor element, an acceptor element in addition to the donor element, and crystal grains. As a result, it was found that when a solid solution was formed from a predetermined amount of donor element, the acceptor element in an amount less than the amount of the donor element, and crystal grains, and a predetermined amount of acceptor element was allowed to present in crystal grain boundaries, a $SrTiO_3$ based grain boundary insulation type semiconductor ceramic having a large apparent relative dielectric constant $\in r_{APP}$ of 5,000 or more and a large resistivity log ρ (ρ: Ω·cm) of 10 or more was able to be obtained even when crystal grains were made fine to have an average grain size of 1.0 μm or less.

Consequently, even when the layer thickness is reduced to 1.0 μm or less, a semiconductor ceramic having a large apparent relative dielectric constant $\in r_{APP}$ as compared with that of a known dielectric ceramic, having an insulating property comparable to that of the known dielectric ceramic, and exhibiting excellent electrical characteristics can be obtained.

Here, the content of donor element is specified to be 0.8 to 2.0 mol relative to 100 mol of Ti element for the following reasons.

The ceramic can be converted to a semiconductor by allowing a donor element having the number of valences larger than that of Sr element to be contained in a solid solution with crystal grains and conducting a firing treatment in a reducing atmosphere. However, the content thereof in terms of mol has an influence on the apparent relative dielectric constant $\in r_{APP}$. That is, if the above-described donor element is less than 0.8 mol relative to 100 mol of Ti element, a desired large apparent relative dielectric constant $\in r_{APP}$ cannot be obtained. On the other hand, if the donor element exceeds 2.0 mol relative to 100 mol of Ti element, the limit of solid solubility into the Sr site is exceeded and the donor element deposits at grain boundaries so as to cause significant reduction in the apparent relative dielectric constant $\in r_{APP}$ and deterioration of the dielectric characteristic.

Therefore, in the present embodiment, the content is specified to be 0.8 to 2.0 mol relative to 100 mol of Ti element, as described above.

Such a donor element is not specifically limited insofar as the element is contained as a solid solution with crystal grains and has a function as a donor. Examples of usable elements include rare earth elements, e.g., La, Sm, Dy, Ho, Y, Nd, and Ce; Nb; Ta; and W.

In the present embodiment, the acceptor element is also contained as a solid solution with crystal grains and, in addition, the acceptor element within the range of 0.3 to 1.0 mol relative to 100 mol of Ti element is present in crystal grain boundaries as well. The acceptor element contained as the solid solution in crystal grains and the acceptor element present in crystal grain boundaries may be the same element or different types of elements.

Such an acceptor element is not specifically limited insofar as the element functions as an acceptor when being contained as a solid solution with crystal grains, and transition metal elements, e.g., Mn, Co, Ni, and Cr, can be used.

Here, the content of acceptor element present in crystal grain boundaries is specified to be 0.3 to 1.0 mol relative to 100 mol of Ti element for the following reasons.

When the acceptor element is contained in the semiconductor ceramic and is allowed to present in crystal grain boundaries, oxygen is adsorbed by crystal grain boundaries due to the above-described acceptor element present in the crystal grain boundaries during the secondary firing. Consequently, the dielectric characteristic can be improved.

However, if the content of acceptor element present in crystal grain boundaries is less than 0.3 mol relative to 100 mol of Ti element, the apparent relative dielectric constant $\in r_{APP}$ cannot be improved satisfactorily, and the resistivity is small. On the other hand, if the content of acceptor element present in crystal grain boundaries exceeds 1.0 mol relative to 100 mol of Ti element, the average grain size exceeds 1.0 μm as well. Consequently, crystal grains are allowed to become coarse, desired reduction in layer thickness becomes difficult and, furthermore, the resistivity decreases.

Therefore, in the present embodiment, the content of acceptor element present in crystal grain boundaries is adjusted to be 0.3 to 1.0 mol relative to 100 mol of Ti element.

In the crystal grains, the content in terms of mol of acceptor element present as a solid solution with crystal grains is not specifically limited insofar as the amount is smaller than the amount of donor element. However, 0.008 to 0.08 mol relative to 100 mol of Ti element is preferable. The reasons are as described below. If the content in terms of mol of acceptor element present as a solid solution with crystal grains is less than 0.008 mol relative to 100 mol of Ti element, the content in terms of mol of acceptor element in the crystal grains is too small and, thereby, the resistivity may not be improved satisfactorily. On the other hand, if the content exceeds 0.08 mol relative to 100 mol of Ti element, the acceptor element becomes excessive relative to the donor element, and reduction in the apparent relative dielectric constant $\in r_{APP}$ may result although the resistivity increases.

If the content of acceptor element present as a solid solution with the crystal grains is converted to a ratio of the acceptor element to the donor element (acceptor element/donor element), the ratio is 1/10 to 1/1000, and preferably 1/10 to 1/100.

It is also preferable that a low-melting-point oxide within the range of 0.1 mol or less relative to 100 mol of Ti element is added to the above-described semiconductor ceramic, in particular, crystal grain boundaries. By addition of such a low-melting-point oxide, the sinterability can be improved and, in addition, the segregation of the above-described acceptor element at crystal grain boundaries can be facilitated.

If the content in terms of mol of the low-melting-point oxide relative to 100 mol of Ti element exceeds 0.1 mol, the apparent relative dielectric constant $\in r_{APP}$ may decrease. Therefore, in the case where the low-melting-point oxide is added, 0.1 mol or less relative to 100 mol of Ti element is preferable, as described above.

Such low-melting-point oxides are not specifically limited, and glass ceramic containing $SiO_2$, B, or an alkali metal element (K, Li, Na, or the like), copper-tungsten oxide, or the like can be used. Preferably, $SiO_2$ is used.

The formulation mole ratio m of the Sr site to the Ti site is not specifically limited insofar as the ratio is in the vicinity of the stoichiometric composition (m=1.000). However, it is preferable that $0.995 \leq m \leq 1.020$ is satisfied. The reasons for this are as described below. If the formulation mole ratio m becomes less than 0.995, the grain sizes of crystal grains become large so that the average grain size may exceed 1.0 μm. On the other hand, if the formulation mole ratio m exceeds 1.020, the deviation from the stoichiometric composition becomes large and sintering may become difficult.

More preferably, the formulation mole ratio m satisfies $0.995 \leq m \leq 1.010$, and further preferably $1.000 \leq m \leq 1.010$.

The average grain size of the semiconductor ceramic crystal grains can be easily controlled at 1.0 μm or less by controlling the manufacturing condition combined with the above-described composition range.

FIG. 1 is a sectional view schematically showing an embodiment of a monolithic semiconductor ceramic capacitor produced by using a semiconductor ceramic according to the present invention.

In the monolithic semiconductor ceramic capacitor, internal electrodes 2 (2a to 2f) are embedded in a component element assembly 1 formed from the semiconductor ceramic of the present invention. In addition, external electrodes 3a and 3b are disposed at two end portions of the component element assembly 1.

That is, the component element assembly 1 is composed of a sintered laminate including a plurality of semiconductor ceramic layers 1a to 1g and the internal electrodes 2a to 2f laminated alternately. The internal electrodes 2a, 2c, and 2e are electrically connected to the external electrode 3a, and the internal electrodes 2b, 2d, and 2f are electrically connected to the external electrode 3b. The capacitance is formed between facing surfaces of the internal electrodes 2a, 2c, and 2e and the internal electrodes 2b, 2d, and 2f.

The above-described monolithic semiconductor ceramic capacitor can obtain an apparent relative dielectric constant $\in_{r_{APP}}$ of 5,000 or more and a resistivity log ρ (ρ: Ω·cm) of 10 or more because the component element assembly 1 is formed from the above-described semiconductor ceramic. Therefore, the manufacturing method is not specifically limited insofar as a semiconductor ceramic having the above-described composition is obtained.

However, it is more preferable that the production is conducted by the above-described manufacturing method because a semiconductor ceramic capacitor ensuring an apparent relative dielectric constant $\in_{r_{APP}}$ of 5,000 or more and having a larger resistivity can be produced by conducting a cooling treatment while the oxygen partial pressure at the time of starting the cooling is set at $1.0 \times 10^4$ times or more the oxygen partial pressure in the firing process in the primary firing treatment conducted in a reducing atmosphere.

This favorable manufacturing method will be described below in detail.

Each of a Sr compound, e.g., $SrCO_3$, as a ceramic raw material, a donor compound containing a donor element, e.g., La or Sm, an acceptor compound, e.g., Mn or Co, and a Ti compound, e.g., $TiO_2$, having a specific surface area of preferably 10 $m^2/g$ or more (average grain size: about 0.1 μm or less), is prepared. The donor compound is weighed in such a way that the content of donor element becomes 0.8 to 2.0 mol relative to 100 mol of Ti element. Furthermore, predetermined amounts of Sr compound and Ti compound are weighed.

A predetermined amount of dispersing agent is added to the weighed materials, and the resulting mixture is put into a ball mill together with water and pulverizing media, e.g., PSZ (Partially Stabilized Zirconia) balls. Wet-mixing is conducted in the ball mill sufficiently so as to prepare a slurry.

The resulting slurry is dried by vaporization and is subjected to a calcination treatment in an air atmosphere at a predetermined temperature (for example, 1,300° C. to 1,450° C.) for about 2 hours so as to prepare a calcined powder in which the donor element and the acceptor element are contained as a solid solution.

A low-melting-point oxide, e.g., $SiO_2$, is weighed in such a way that the content thereof becomes 0 to 0.1 mol relative to 100 mol of Ti element. Furthermore, the acceptor compound is weighed in such a way that the content of acceptor element, e.g., Mn or Co, becomes 0.3 to 1.0 mol relative to 100 mol of Ti element. The low-melting-point oxide and the acceptor compound are blended with the above-described calcined powder, pure water, and a dispersing agent, if necessary, and wet-mixing is conducted sufficiently. Drying was conducted by vaporization and, thereafter, a heat treatment is conducted in an air atmosphere at a predetermined temperature (for example, 600° C.) for about 5 hours so as to prepare a heat-treated powder.

The resulting heat-treated powder is blended with appropriate amounts of organic solvent, e.g., toluene or alcohol, and dispersing agent, and is put into the ball mill again together with the above-described pulverizing media so as to be wet-milled in the ball mill sufficiently. Appropriate amounts of organic binder and plasticizer are added, wet-mixing is conducted sufficiently for a long time period and, thereby, a ceramic slurry is obtained.

The ceramic slurry is subjected to molding by using a molding method, e.g., a doctor blade method, a lip coating method, or a die coating method so as to prepare ceramic green sheets in such a way that the thickness after the firing becomes a predetermined thickness (for example, about 1 to 2 μm).

An electrically conductive film with a predetermined pattern is formed on a surface of the above-described ceramic green sheet by screen-printing or gravure-printing an electrically conductive paste for the internal electrode on the ceramic green sheet or by conducting vapor deposition, sputtering, or the like.

The electrically conductive material contained in the electrically conductive paste for the internal electrode is not specifically limited. However, it is preferable that a base metal material, e.g., Ni or Cu, is used.

A plurality of ceramic green sheets provided with the electrically conductive film are laminated in a predetermined direction and, in addition, ceramic green sheets for external layers provided with no electrically conductive film are laminated, followed by press-bonding and cutting into a predetermined dimension, so as to produce a ceramic laminate.

Subsequently, a binder removal treatment is conducted in an air atmosphere at a temperature of 200° C. to 300° C. and, furthermore, in a weak reducing atmosphere at a temperature of 700° C. to 800° C., if necessary. A firing furnace with a reducing atmosphere, in which the ratio of flow rate of a $H_2$ gas to a $N_2$ gas is specified to be a predetermined value (for example, $H_2/N_2=0.025/100$ to 1/100), is used. Primary firing is conducted in the firing furnace at a temperature of 1,150° C. to 1,300° C. for about 2 hours so as to convert the ceramic laminate to a semiconductor. That is, the primary firing is conducted at a temperature lower than or equal to the calcination temperature (1,300° C. to 1,450° C.) so as to convert the ceramic laminate to a semiconductor.

In this primary firing treatment, the oxygen partial pressure in the firing furnace is sharply increased at the time of starting the cooling after the firing, the oxygen partial pressure at the time of starting of the cooling (the oxygen partial pressure during cooling) is set at $1.0 \times 10^4$ times or more the oxygen partial pressure during the firing process (the oxygen partial pressure during firing), and the cooling treatment is conducted. Consequently, a larger resistivity is obtained.

That is, in the present embodiment, large amounts of steam is supplied to the firing furnace at the time of starting of the cooling after the firing, and furthermore, the supply rate of the $H_2$ gas in the firing furnace is decreased by a predetermined amount (for example, 1/10) so as to sharply increase the oxygen partial pressure in the firing furnace, and the cooling treatment is conducted while the ratio of the oxygen partial pressure during cooling to the oxygen partial pressure during firing, that is, the oxygen partial pressure ratio $\Delta PO_2$, is set at $1.0 \times 10^4$ or more. Consequently, a still larger resistivity is obtained while an apparent relative dielectric constant $\in r_{APP}$ of 5,000 or more is ensured.

The above-described "time of starting the cooling" includes not only the point in time when the cooling process is started, but also a short time after the cooling process is started until the temperature in a firing furnace decreases by a predetermined temperature (for example, 30° C. to 50° C.) from a maximum firing temperature.

The reason the oxygen partial pressure during cooling is set at $1.0 \times 10^4$ times or more the oxygen partial pressure during firing will be described with reference to FIG. 2.

Figure 2:
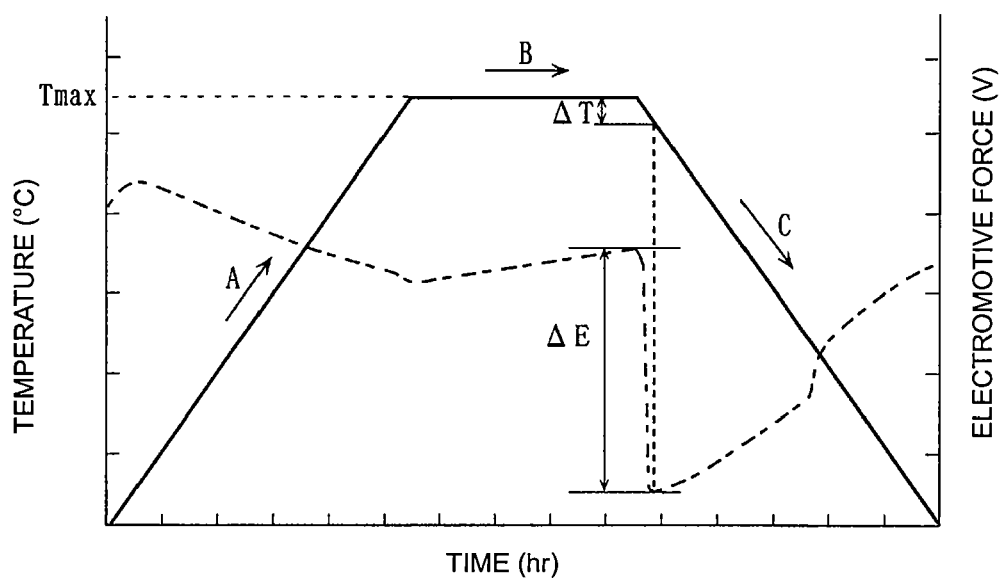
FIG. 2 is a diagram showing an example of a firing profile and changes in electromotive force over time.

FIG. 2 is a diagram showing the firing profile and changes in electromotive force E over time. The horizontal axis indicates the time (hr), the left vertical axis indicates the temperature (° C.), and the right vertical axis indicates the electromotive force E (V). A solid line indicates the firing profile and an alternate long and short dash line indicates changes in electromotive force over time.

That is, according to the firing profile, the temperature in the furnace is raised as indicated by an arrow A at the time of starting the firing treatment (temperature raising process), a maximum firing temperature Tmax (in the present embodiment, 1,150° C. to 1,300° C.) is maintained for about 2 hours as indicated by an arrow B (firing process), and the temperature in the furnace is lowered to cool the fired product as indicated by an arrow C (cooling process).

On the other hand, as shown by Mathematical expression (1), the Nernst equation holds between the electromotive force E (V) and the oxygen partial pressure $PO_2$ (atm) in the firing furnace.

$$E = (2.15 \times 10^{-5} \times T) \times \ln(PO_2/0.206) \quad (1)$$

where T indicates an absolute temperature (K) in the firing furnace.

Therefore, the oxygen partial pressure $PO_2$ can be determined by measuring the electromotive force E.

Steam was supplied to the firing furnace at the time of starting of the cooling process, and furthermore, the supply rate of the $H_2$ gas to the firing furnace was decreased, if necessary, while changes in the electromotive force E in the firing furnace over time were measured with a direct-insert type zirconia oxygen sensor. Consequently, as shown by the alternate long and short dash line in FIG. 2, it was found that the electromotive force E always became at a local minimum at the point in time when the temperature in the furnace was lowered by a predetermined temperature $\Delta T$ (for example, 30° C. to 50° C.) from the maximum firing temperature Tmax and, thereafter, the electromotive force E increased gradually. Therefore, the oxygen partial pressure $PO_2$ becomes at a local maximum at the point in time when the temperature in the furnace is lowered by a predetermined temperature $\Delta T$ from the maximum firing temperature Tmax on the basis of Mathematical expression (1).

The inventors of the present invention conducted experiments repeatedly in such a way that the oxygen partial pressure during cooling was specified to be the local maximum oxygen partial pressure $PO_2$, the oxygen partial pressure during firing was specified to be the oxygen partial pressure at the maximum firing temperature Tmax, and the supply rate of the steam and the supply rate of the $H_2$ gas to the firing furnace were adjusted to variously differentiate the oxygen partial pressure ratio $\Delta PO_2$ of the two oxygen partial pressures (=oxygen partial pressure during cooling/oxygen partial pressure during firing). As a result, it was found that a still larger resistivity was able to be obtained while an apparent relative dielectric constant $\in r_{APP}$ of 5,000 or more was ensured by setting the oxygen partial pressure ratio $\Delta PO_2$ at $1.0 \times 10^4$ or more.

From these reasons, in the present embodiment, the cooling treatment is conducted while the above-described oxygen partial pressure ratio $\Delta PO_2$ is set at $1.0 \times 10^4$ times or more.

After the ceramic laminate is converted to the semiconductor by the primary firing as described above, the secondary firing is conducted in a weak reducing atmosphere, an air atmosphere, or an oxidizing atmosphere at a low temperature of 600° C. to 900° C. not to oxidize the internal electrode material, e.g., Ni or Cu, for 1 hour. In this manner, the semiconductor ceramic is reoxidized and a grain boundary insulating layer is formed, so that the component element assembly 1, in which the internal electrodes 2 are embedded, is produced.

An electrically conductive paste for the external electrodes is applied to both end surfaces of the component element assembly 1, and a baking treatment is conducted so as to form external electrodes 3a and 3b. In this manner, a monolithic semiconductor ceramic capacitor is produced.

The electrically conductive material contained in the electrically conductive paste for external electrode is not specifically limited as well. However, it is preferable to use a material, such as Ga, In, Ni, or Cu. Furthermore, a Ag electrode may be formed on the electrode.

Alternatively, the external electrodes 3a and 3b may be formed by a method in which the electrically conductive paste for external electrode is applied to both end surfaces of a ceramic laminate and, thereafter, the firing treatment is conducted simultaneously with the ceramic laminate.

As described above, in the present embodiment, the monolithic semiconductor ceramic capacitor is produced by using the above-described semiconductor ceramic. Therefore, the layer thickness of each of semiconductor ceramic layers 1a to 1g can be reduced to 1 µm or less. Furthermore, a small, high-capacity monolithic semiconductor ceramic capacitor can be obtained, which has a large apparent relative dielectric constant $\in r_{APP}$ of 5,000 or more per layer even after the layer thickness is reduced, a large resistivity log ρ (ρ: Ω·cm) of 10 or more, and a good insulating property comparable to that of the known monolithic ceramic capacitor. Moreover, in contrast to a high-capacity tantalum capacitor, ease of handling is exhibited because the polarity needs not be taken into consideration, and the resistance is low even in a high frequency range. Therefore, the effectiveness as an alternative to the tantalum capacitor is high.

It is known that the $SrTiO_3$ based grain boundary insulation type semiconductor ceramic has a varistor characteristic, as is described hereinabove. In the present embodiment, since the average grain size of crystal grains is 1.0 µm or less and, therefore, the crystal grains are fine grains, the varistor voltage can increase. Consequently, the use as a capacitor in a usual field strength region (for example, 1 V/µm), in which the voltage-current characteristic exhibits linearity, broadens the versatility of application as the capacitor. In addition, since the varistor characteristic is provided, breakage of the element can be prevented even when an abnormally high voltage is applied to the element, and a capacitor exhibiting excellent reliability can be obtained.

Since the varistor voltage can increase as described above, a capacitor capable of avoiding breakage due to a surge voltage and the like can be realized. Since the breakage voltage is high, it is possible to use for the application to an ESDresistant capacitor, although a low-capacity capacitor to be used for the purpose of ESD (electro-static discharge) is required to have a surge-resistant characteristic.

The present invention is not limited to the above-described embodiment. FIG. 1 shows the monolithic semiconductor ceramic capacitor including the plurality of semiconductor ceramic layers 1a to 1g and the internal electrodes 2a to 2f laminated alternately. However, a monolithic semiconductor ceramic capacitor having a structure, in which an internal electrode is formed on a surface of a single plate (for example, thickness is about 200 μm) of semiconductor ceramic through evaporation or the like and several layers (for example, two or three layers) of the single plate are bonded together with an adhesive, can also be used. Such a structure is effective for a monolithic semiconductor ceramic capacitor to be used for a low-capacitor application, for example.

In the above-described embodiment, the solid solution is prepared by a solid phase method. However, the method for preparing the solid solution is not specifically limited. Any method, for example, a hydrothermal synthesis method, a sol-gel method, a hydrolysis method, and a coprecipitation method, can be used.

In the above-described embodiment, the secondary firing (reoxidation treatment) is conducted in the air atmosphere to form the grain boundary insulating layer. However, desired operation and effect can be obtained even when the oxygen concentration is somewhat lower than that in the air atmosphere, if necessary.

Furthermore, in the primary firing treatment of the above-described method for manufacturing a monolithic semiconductor ceramic capacitor, the cooling treatment is conducted while the oxygen partial pressure at the time of starting the cooling is set at $1.0 \times 10^4$ times or more the oxygen partial pressure in the firing process. However, even when the primary firing treatment is conducted without specifically changing the above-described oxygen partial pressure in the firing furnace, an apparent relative dielectric constant $\in r_{APP}$ of 5,000 or more and a large resistivity $\log \rho$ ($\rho$: $\Omega \cdot cm$) of 10 or more can be obtained. In this case, the semiconductor ceramic can be produced usually as described below.

That is, a donor compound is weighed in such a way that a donor element becomes within the range of 0.8 to 2.0 mol relative to 100 mol of Ti element, and a predetermined amount of predetermined ceramic raw material containing an acceptor compound is weighed. After mixing and pulverizing, a calcining treatment is conducted so as to prepare a calcined powder. Subsequently, the acceptor compound is weighed in such a way that an acceptor element becomes within the range of 0.3 to 1.0 mol relative to 100 mol of the above-described Ti element, and if necessary, a low-melting point oxide, e.g., $SiO_2$, is weighed. They are mixed with the above-described calcined powder and a heat treatment is conducted so as to prepare a heat-treated powder. The resulting heat-treated powder is subjected to a primary firing treatment in a reducing atmosphere and, thereafter, is subjected to a secondary firing treatment in a weak reducing atmosphere, an air atmosphere, or an oxidizing atmosphere, so that a semiconductor ceramic can be produced.

The examples of the present invention will be specifically described below.

Example 1

In Example 1, a semiconductor ceramic capacitor having a single-layered structure was produced, and electrical characteristics were evaluated.

Each of $SrCO_3$, $LaCl_3$, $MnCl_2$, and $TiO_2$ having a specific surface area of 30 $m^2/g$ (average grain size: about 30 nm) was prepared as a ceramic raw material. The ceramic raw materials were weighed in such a way that the semiconductor ceramic had the composition shown in Table 1. Furthermore, 2 parts by weight of ammonium polycarboxylate relative to 100 parts by weight of the weighed material was added as a dispersing agent. The resulting mixture was put into a ball mill together with pure water and PSZ balls having a diameter of 2 mm. Wet-mixing was conducted in the ball mill for 16 hours so as to prepare a slurry.

The resulting slurry was dried by vaporization and was subjected to a calcination treatment in an air atmosphere at a temperature of 1,400° C. for about 2 hours so as to prepare a calcined powder in which the La element and the Mn element were contained in a solid solution.

A $MnCl_2$ aqueous solution and a $SiO_2$ sol solution were added to the above-described calcined powder in such a way that the contents of the Mn element and $SiO_2$ in terms of mol became those shown in Table 1 relative to 100 mol of Ti element in the crystal grain boundaries. Pure water and a dispersing agent, if necessary, were added and wet-mixing was conducted for 16 hours. Drying was conducted by vaporization and, thereafter, a heat treatment was conducted in an air atmosphere at a temperature of 600° C. for 5 hours so as to prepare a heat-treated powder. A $MnO_2$ sol may be used instead of the $MnCl_2$ aqueous solution, and tetraethoxysilane ($Si(OC_2H_5)_4$) may be used instead of the $SiO_2$ sol solution.

The above-described heat-treated powder was blended with appropriate amounts of organic solvent, e.g., toluene or alcohol, and dispersing agent, and was put into the ball mill again together with the PSZ balls having a diameter of 2 mm. Wet-mixing was conducted for 6 hours in the ball mill. Appropriate amounts of polyvinylbutyral (PVB) serving as a binder and dioctyl phthalate (DOP) serving as a plasticizer were added, wet-mixing was further conducted for 16 hours and, thereby, a ceramic slurry was prepared.

The resulting ceramic slurry was subjected to molding by using a doctor blade method so as to prepare ceramic green sheets. The resulting ceramic green sheets were stamped into a predetermined size, and were stacked on top of each other to have a thickness of about 0.5 mm, followed by thermal compression bonding, so that a ceramic compact was prepared.

The resulting ceramic compact was cut into a size 5 mm long and 5 mm wide and, thereafter, a binder removal treatment was conducted in an air atmosphere, in an air atmosphere at a temperature of 250° C. and, furthermore, in a weak reducing atmosphere at a temperature of 800° C. for 5 hours. Primary firing was conducted in a strong reducing atmosphere, in which the ratio of flow rate of a $H_2$ gas to a $N_2$ gas was specified in such a way as to satisfy $H_2:N_2=1:100$, at a temperature of 1,200° C. to 1,250° C. for 2 hours and, thereby, conversion to a semiconductor was effected. Subsequently, the secondary firing was conducted in an air atmosphere at a temperature of 800° C. for 1 hour to apply a reoxidation treatment so as to produce a grain boundary insulation type semiconductor ceramic.

Both end surfaces were coated with In—Ga so as to produce external electrodes. In this manner, samples of Sample Nos. 1 to 15 were produced.

Each sample was observed with a scanning electron microscope (SEM). SEM photographs of a sample surface and a fracture surface were subjected to image analysis, and an average grain size of crystal grains (average crystal grain size) was determined.

The capacitance of each sample was measured by using an impedance analyzer (HP4194A: produced by Hewlett-Packard Company) under the condition of a frequency of 1 kHz and a voltage of 1 V. The apparent relative dielectric constant $\in r_{APP}$ was calculated from the measured capacitance and the sample dimension.

Each sample of Sample Nos. 1 to 15 was applied with a direct current voltage of 5 to 500 V for 2 minutes, and the insulation resistance IR was measured on the basis of the leakage current thereof. The resistivity log ρ (ρ: Ω·cm) under a field strength of 1 V/μm was determined on the basis of the resulting insulation resistance IR and the sample dimension.

Table 1 shows the compositions of crystal grains and crystal grain boundaries of Sample Nos. 1 to 15 and the measurement results thereof.

TABLE 1

| Sample No. | Crystal grain | | | Crystal grain boundary | | Average crystal grain size (μm) | Electrical characteristics | |
|---|---|---|---|---|---|---|---|---|
| | Formulation mole ratio m | La (mol) | Mn (mol) | Mn (mol) | SiO₂ (mol) | | Apparent relative dielectric constant $\in r_{APP}$ | Resistivity log ρ (ρ: Ω·cm) |
| 1 | 1.010 | 0.8 | 0.008 | 0.5 | 0.1 | 0.4 | 5210 | 10.3 |
| 2 | 1.010 | 0.8 | 0.08 | 0.5 | 0.1 | 0.5 | 5960 | 10.0 |
| 3 | 1.010 | 0.8 | 0.008 | 0.7 | 0.1 | 0.5 | 6020 | 10.1 |
| 4 | 1.010 | 0.8 | 0.008 | 0.3 | 0.1 | 0.4 | 5010 | 10.2 |
| 5 | 1.010 | 0.8 | 0.04 | 0.5 | 0.1 | 0.5 | 5430 | 10.2 |
| 6 | 1.000 | 0.8 | 0.008 | 0.5 | 0.1 | 0.6 | 5320 | 10.1 |
| 7 | 0.995 | 0.8 | 0.008 | 0.5 | 0.1 | 0.9 | 6220 | 10.0 |
| 8 | 1.010 | 2.0 | 0.008 | 0.5 | 0.1 | 0.4 | 5010 | 10.4 |
| 9 | 1.010 | 0.8 | 0.008 | 1.0 | 0.1 | 0.8 | 6310 | 10.0 |
| 10 | 1.010 | 0.8 | 0.008 | 0.5 | 0 | 0.5 | 5610 | 10.4 |
| 11* | 1.010 | 0.8 | 0 | 0.5 | 0.1 | 0.5 | 5780 | 9.5 |
| 12* | 1.010 | 0.6 | 0.008 | 0.5 | 0.1 | 0.6 | 4500 | 10.5 |
| 13* | 1.010 | 2.5 | 0.008 | 0.5 | 0.1 | 0.4 | 3700 | 10.4 |
| 14* | 1.010 | 0.8 | 0.008 | 0.25 | 0.1 | 0.6 | 2840 | 8.7 |
| 15* | 1.010 | 0.8 | 0.008 | 1.5 | 0.1 | 1.8 | 5030 | 8.1 |

*asterisked sample numbers indicate samples which are out of the present invention As is clear from this Table 1, regarding Sample No 11, since Mn, which was an acceptor element, was not contained in the crystal grains, the resistivity log ρ was a low 9.5, that is, 10 or less, although the apparent relative dielectric constant $\in r_{APP}$ exceeded 5,000. Consequently, a desired high resistivity was not able to be obtained.

Regarding Sample No. 12, the content in terms of mol of La, which was a donor element, in the crystal grains was 0.6 mol relative to 100 mol of Ti element and, therefore, was less than 0.8 mol. Consequently, the apparent relative dielectric constant $\in r_{APP}$ was 4,500 and, therefore, decreased to less than 5,000.

Regarding Sample No. 13, the above-described content in terms of mol of La in the crystal grains was 2.5 mol relative to 100 mol of Ti element and, therefore, was excessive. Consequently, the apparent relative dielectric constant $\in r_{APP}$ was 3,700 and, therefore, decreased significantly.

Regarding Sample No. 14, the content in terms of mol of Mn in the crystal grain boundaries was 0.25 mol relative to 100 mol of Ti element and, therefore, was less than 0.3 mol. Consequently, the apparent relative dielectric constant $\in r_{APP}$ was 2,840 and, therefore, decreased to less than 5,000. The resistivity log ρ was a low 8.7.

Regarding Sample No. 15, the content in terms of mol of Mn in the crystal grain boundaries was 1.5 mol relative to 100 mol of Ti element and, therefore, exceeded 1.0 mol. Consequently, the average crystal grain size was 1.8 μm and, therefore, the grains became coarse. The resistivity log ρ was a low 8.1.

If the content in terms of mol of SiO₂, which is a low-melting-point oxide, exceeds 0.1 mol relative to 100 mol of Ti element, the apparent relative dielectric constant $\in r_{APP}$ may decrease. Therefore, it is preferable that the content in terms of mol of SiO₂ relative to 100 mol of Ti element is 0.1 mol or less.

On the other hand, regarding Sample Nos. 1 to 10, the contents in terms of mol of La, which was a donor element, in the crystal grains were 0.8 to 2.0 mol relative to 100 mol of Ti element, and Mn, which was an acceptor element, was contained together with La as a solid solution with crystal grains. Furthermore, 0.3 to 1.0 mol of Mn was present relative to 100 mol of Ti element in crystal grain boundaries as well. Moreover, SiO₂ was contained, and the content in terms of mol thereof was 0.1 mol or less relative to 100 mol of Ti element. Consequently, the average crystal grain size became 0.4 to 0.9 μm, the apparent relative dielectric constant $\in r_{APP}$ became 5,010 to 6,310, and the resistivity log ρ became 10.0 to 10.4. That is, it was found that a semiconductor ceramic having good electrical characteristics, such as the apparent relative dielectric constant $\in r_{APP}$ of 5,000 or more and the resistivity log ρ of 10 or more, was able to be obtained in spite of the fact that the average crystal grain size was 1.0 μm or less.

Regarding Sample No. 7, the average crystal grain size was 1.0 μm or less, but a somewhat large 0.9 μm. The reason for this is believed that the formulation mole ratio m of the Sr site to the Ti site (=Sr site/Ti site) was a small 0.995. That is, it is believed that if the formulation mole ratio m is excessively deviated from the stoichiometric composition and becomes too small, the average crystal grain size tends to become coarse.

Example 2

In Example 2, samples (semiconductor ceramic capacitors having a single plate structure) of Sample Nos. 21 to 25 were produced by changing the oxygen partial pressure in the cooling process of the primary firing, the samples having the same compositions as those of Sample Nos. 1 and 2 in [Example 1], and the effect of an increase in the oxygen partial pressure was checked.

That is, ceramic compacts having the compositions shown by Sample Nos. 21 to 25 in Table 2 were prepared by the method and the procedure similar to those in [Example 1]. The resulting ceramic compact was cut into a size 5 mm long and 5 mm wide and, thereafter, a binder removal treatment was conducted in an air atmosphere at a temperature of 250° C. and, furthermore, in a weak reducing atmosphere at a temperature of 800° C. for 5 hours.

Primary firing was conducted in a strong reducing atmosphere, in which the ratio of flow rate of a $H_2$ gas to a $N_2$ gas was set in such a way as to satisfy $H_2:N_2=1:100$, at a temperature of 1,200° C. to 1,250° C. for 2 hours. At this time, the cooling treatment was conducted until the firing furnace became 800° C. while the oxygen partial pressure $PO_2$ was adjusted in such a way that the oxygen partial pressure ratio $\Delta PO_2$ (=Oxygen partial pressure during cooling/oxygen partial pressure during firing) became the value shown in Table 2. That is, in the cooling treatment, steam was supplied to the firing furnace at the time of starting of the cooling process, and furthermore, while the supply rate of the $H_2$ gas was decreased, if necessary, while a zirconia oxygen sensor was inserted into the firing furnace and the electromotive force E, that is, the oxygen partial pressure $PO_2$, in the firing furnace was measured so as to control the oxygen partial pressure ratio $\Delta PO_2$ at the value shown in Table 2.

Subsequently, the secondary firing was conducted in an air atmosphere at a temperature of 800° C. for 1 hour to apply a reoxidation treatment so as to produce a grain boundary insulation type semiconductor ceramic. Both end surfaces were coated with In—Ga. In this manner, samples of Sample Nos. 21 to 25 were produced.

Regarding each sample of Sample Nos. 21 to 25, the average crystal grain size, the apparent relative dielectric constant $\in r_{APP}$, and the resistivity log ρ were determined by the method and the procedure similar to those in [Example 1].

Table 2 shows the compositions of crystal grains and crystal grain boundaries of Sample Nos. 21 to 25 and the measurement results. For purposes of comparison, Sample Nos. 1 and 2 produced in [Example 1] are shown in Table 2 again.

the oxygen partial pressure during the cooling was not increased. As a result, an increase in resistivity log ρ based on the effect of an increase in oxygen partial pressure did not occur.

On the other hand, regarding Sample No. 22, it was found that the oxygen partial pressure ratio $\Delta PO_2$ was $1.0 \times 10^4$ and the resistivity log ρ increased to 10.8.

Furthermore, regarding Sample No. 23, the oxygen partial pressure ratio $\Delta PO_2$ was a larger $2.7 \times 10^5$ and the resistivity log ρ was 11.2. Therefore, it was found that the resistivity log ρ further increased.

Likewise, comparisons were made between Sample No. 2 and Sample Nos. 24 and 25. Sample No. 2 was conducted in the strong reducing atmosphere and the oxygen partial pressure was not increased during the cooling of the primary firing. Therefore, the resistivity log ρ did not exceed 10.0.

On the other hand, regarding Sample No. 24, the cooling treatment was conducted while the oxygen partial pressure ratio $\Delta PO_2$ was set at $1.8 \times 10^4$ and, therefore, the resistivity log ρ increased to 10.5. Regarding Sample No. 25, it was found that since the cooling treatment was conducted while the oxygen partial pressure ratio $\Delta PO_2$ was set at a larger $3.8 \times 10^5$, the resistivity log ρ further increased to 10.7.

As described above, it was found that by setting the oxygen partial pressure ratio $\Delta PO_2$ at $1.0 \times 10^4$ or more during the cooling, the resistivity log ρ was able to further increase while the apparent relative dielectric constant $\in r_{APP}$ of 5,000 or more was ensured and, therefore, the insulating property was able to be further improved. In addition, it was found that a semiconductor ceramic capacitor having a larger resistivity log ρ was able to be obtained by further increasing the oxygen partial pressure ratio $\Delta PO_2$ in the case where the composition and component of dielectric ceramic remained unchanged.

Example 3

In Example 3, semiconductor ceramic capacitors having a laminated structure were produced by using samples having the same composition as that of Sample No. 1 in [Example 1], and electrical characteristics were evaluated. In [Example 3] as well, the treatment was conducted by changing the oxygen partial pressure in the cooling process of the primary firing.

TABLE 2

| | Crystal grain | | | Crystal grain boundary | | Oxygen partial pressure ratio $\Delta PO_2$ (—) | Average crystal grain size (μm) | Electrical characteristics | |
|---|---|---|---|---|---|---|---|---|---|
| Sample No. | Formulation mole ratio m | La (mol) | Mn (mol) | Mn (mol) | $SiO_2$ (mol) | | | Apparent relative dielectric constant $\in r_{APP}$ | Resistivity log ρ (ρ: Ω · cm) |
| 1  | 1.010 | 0.8 | 0.008 | 0.5 | 0.1 | —                 | 0.4 | 5210 | 10.3 |
| 21 | 1.010 | 0.8 | 0.008 | 0.5 | 0.1 | $2.3 \times 10^3$ | 0.4 | 5180 | 10.3 |
| 22 | 1.010 | 0.8 | 0.008 | 0.5 | 0.1 | $1.0 \times 10^4$ | 0.4 | 5110 | 10.8 |
| 23 | 1.010 | 0.8 | 0.008 | 0.5 | 0.1 | $2.7 \times 10^5$ | 0.4 | 5050 | 11.2 |
| 2  | 1.010 | 0.8 | 0.08  | 0.5 | 0.1 | —                 | 0.5 | 5960 | 10.0 |
| 24 | 1.010 | 0.8 | 0.08  | 0.5 | 0.1 | $1.8 \times 10^4$ | 0.5 | 6820 | 10.5 |
| 25 | 1.010 | 0.8 | 0.08  | 0.5 | 0.1 | $3.8 \times 10^5$ | 0.5 | 7100 | 10.7 |

Comparisons are made between Sample No. 1 and Sample Nos. 21 to 23. Regarding Sample No. 21, the oxygen partial pressure ratio $\Delta PO_2$ was $2.3 \times 10^3$ and, therefore, was $1.0 \times 10^4$ or less in spite of the fact that the oxygen partial pressure was increased during the cooling. Consequently, the resistivity log ρ was at the same level as that of Sample No. 1 in which That is, ceramic slurries having the compositions shown by Sample Nos. 31 and 32 in Table 3 were prepared by the method and the procedure similar to those in [Example 1]. The resulting ceramic slurry was subjected to molding by using a lip coating method so as to prepare ceramic green sheets having a thickness of about 3.2 μm.

An electrically conductive paste for internal electrode containing Ni as a primary component was prepared. The electrically conductive paste for internal electrode was used and an electrically conductive film with a predetermined pattern was formed on a surface of the ceramic green sheet by a screen printing method.

One set of ceramic layers was prepared by sandwiching five ceramic green sheets provided with no electrically conductive film between the ceramic green sheets provided with the electrically conductive film. Ten sets of the ceramic layers were laminated, ceramic green sheets provided with no electrically conductive film were disposed on the top and the bottom of the resulting laminate, and thermal compression bonding was conducted. In this manner, a ceramic laminate was obtained.

The resulting ceramic laminate was cut into a predetermined size and, thereafter, a binder removal treatment was conducted in an air atmosphere at a temperature of 250° C. for 6 hours and, furthermore, in an atmosphere under a reduced pressure of $1.4 \times 10^{-15}$ MPa at a temperature of 800° C. for 5 hours.

Primary firing was conducted in a strong reducing atmosphere, in which the ratio of flow rate of a $H_2$ gas to a $N_2$ gas was set in such a way as to satisfy $H_2:N_2=1:100$, at a temperature of 1,200° C. to 1,250° C. for 2 hours, so that conversion to a semiconductor was effected. At this time, the cooling treatment was conducted while the oxygen partial pressure $PO_2$ was adjusted in such a way that the oxygen partial pressure ratio $\Delta PO_2$ (=Oxygen partial pressure during cooling/oxygen partial pressure during firing) became the value shown in Table 3 by the method similar to that in [Example 2].

Subsequently, the secondary firing was conducted in an air atmosphere at a temperature of 800° C. for 1 hour to apply a reoxidation treatment so as to produce a grain boundary insulation type semiconductor ceramic. The thus obtained semiconductor ceramic had a length of 2.0 mm, a width of 1.2 mm, and a thickness of 1.0 mm, the thickness per semiconductor ceramic layer was 13 μm, and the number of laminated layers was 10 layers.

Both end surfaces of the semiconductor ceramic were polished and, thereafter, both end surfaces were coated with In—Ga so as to form external electrodes. In this manner, samples of Sample Nos. 31 and 32 were produced.

Regarding each sample of Sample Nos. 31 and 32, the average crystal grain size, the apparent relative dielectric constant $\in r_{APP}$, and the resistivity log ρ were determined by the method and the procedure similar to those in [Example 1].

Table 3 shows the compositions of crystal grains and crystal grain boundaries of Sample Nos. 31 and 32 and the measurement results.

As is clear from Table 3, regarding each of Sample Nos. 31 and 32, the average crystal grain size was 1.0 μm or less, the apparent relative dielectric constant $\in r_{APP}$ was 5,000 or more, and the resistivity log ρ was 11.0 or more. That is, it was found that the insulating property was able to be further improved while a high apparent relative dielectric constant $\in r_{APP}$ was ensured regarding the monolithic semiconductor ceramic capacitor as well.

The invention claimed is:

1. A $SrTiO_3$ based grain boundary insulation type semiconductor ceramic comprising:
    a solid solution with crystal grains, the solid solution containing:
        a donor element within the range of 0.8 to 2.0 mol relative to 100 mol of the Ti element;
        a first acceptor element in an amount less than the amount of the donor element; and
    a second acceptor element within the range of 0.3 to 1.0 mol relative to 100 mol of the Ti element in crystal grain boundaries,
    wherein an average grain size of the crystal grains is 1.0 μm or less.

2. The semiconductor ceramic according to claim 1, wherein the donor element comprises at least one element selected from the group consisting of La, Sm, Dy, Ho, Y, Nd, Ce, Nb, Ta, and W.

3. The semiconductor ceramic according to claim 1, wherein the first acceptor element comprises at least one element selected from the group consisting of Mn, Co, Ni, and Cr.

4. The semiconductor ceramic according to claim 1, wherein the second acceptor element comprises at least one element selected from the group consisting of Mn, Co, Ni, and Cr.

5. The semiconductor ceramic according to claim 1, wherein the first acceptor element and the second acceptor element are the same element.

6. The semiconductor ceramic according to claim 5, wherein the first acceptor element and the second acceptor element comprise at least one element selected from the group consisting of Mn, Co, Ni, and Cr.

7. The semiconductor ceramic according to claim 1, wherein the first acceptor element and the second acceptor element are different types of elements.

8. The semiconductor ceramic according to claim 1, wherein the semiconductor ceramic further comprises a low-melting-point oxide within the range of 0.1 mol or less relative to 100 mol of the Ti element.

TABLE 3

| | Crystal grain | | | Crystal grain boundary | | Oxygen partial pressure ratio $\Delta PO_2$ (—) | Electrical characteristics | | |
|---|---|---|---|---|---|---|---|---|---|
| | | | | | | | Average crystal grain size (μm) | Apparent relative dielectric constant $\in r_{APP}$ | Resistivity log ρ (ρ: Ω · cm) |
| Sample No. | Formulation mole ratio m | La (mol) | Mn (mol) | Mn (mol) | $SiO_2$ (mol) | | | | |
| 31 | 1.010 | 0.8 | 0.008 | 0.5 | 0.1 | $1.1 \times 10^4$ | 0.6 | 5010 | 11.0 |
| 32 | 1.010 | 0.8 | 0.008 | 0.5 | 0.1 | $5.5 \times 10^5$ | 0.4 | 5000 | 11.2 |

9. The semiconductor ceramic according to claim 8, wherein the low-melting-point oxide is in the crystal grain boundaries.

10. The semiconductor ceramic according to claim 8, wherein the low-melting-point oxide is $SiO_2$.

11. A monolithic semiconductor ceramic capacitor comprising:
- a component element assembly formed from the semiconductor ceramic according to claim 1;
- internal electrodes disposed in the component element assembly; and
- external electrodes electrically connectable to the internal electrodes disposed on a surface of the component element assembly.

12. A method for manufacturing a $SrTiO_3$ based grain boundary insulation type semiconductor ceramic, the method comprising:
- weighing, mixing, and pulverizing a predetermined amount of ceramic raw material containing a donor compound and a first acceptor compound and conducting a calcination treatment so as to prepare a calcined powder;
- mixing a predetermined amount of a second acceptor compound with the calcined powder and conducting a heat treatment so as to prepare a heat-treated powder; and
- subjecting the heat-treated powder to a primary firing treatment in a reducing atmosphere and conducting a secondary firing treatment in one of a weak reducing atmosphere, an air atmosphere, and an oxidizing atmosphere,
- wherein the donor compound is weighed to be within the range of 0.8 to 2.0 mol relative to 100 mol of Ti element, the predetermined amount of the first acceptor compound is weighed to be within the range of 0.3 to 1.0 mol relative to 100 mol of the Ti element.

13. A method for manufacturing a $SrTiO_3$ based grain boundary insulation type semiconductor ceramic monolithic capacitor, the method comprising:
- weighing, mixing, and pulverizing a predetermined amount of ceramic raw material containing a donor compound and a first acceptor compound and conducting a calcination treatment so as to prepare a calcined powder;
- mixing a predetermined amount of a second acceptor compound with the calcined powder and conducting a heat treatment so as to prepare a heat-treated powder;
- subjecting the heat-treated powder to molding to prepare ceramic green sheets;
- laminating internal electrode layers and the ceramic green sheets alternately so as to form a ceramic laminate; and
- subjecting the ceramic laminate to a primary firing treatment in a reducing atmosphere and conducting a secondary firing treatment in one of a weak reducing atmosphere, an air atmosphere, and an oxidizing atmosphere,
- wherein the first firing treatment is carried out on the basis of a firing profile including a temperature raising process, a firing process, and a cooling process, and
- wherein the oxygen partial pressure at a time of starting the cooling process is set at $1.0 \times 10^4$ times or more the oxygen partial pressure in the firing process.

14. The method for manufacturing a monolithic capacitor according to claim 13, wherein steam is supplied at the time of starting the cooling process.

15. The method for manufacturing a monolithic capacitor according to claim 14, wherein a supply rate of $H_2$ gas is decreased at the time of starting the cooling process.

* * * * *